United States Patent [19]
Schmall

[11] 4,298,784
[45] Nov. 3, 1981

[54] ARRANGEMENT FOR MEASURING THE DISTANCE BETWEEN A METALLIC WORKPIECE AND A PROCESSING TOOL

[76] Inventor: Karl-Heinz Schmall, Moncalieristr. 5, 757 Baden-Baden, Fed. Rep. of Germany

[21] Appl. No.: 53,255

[22] Filed: Jun. 29, 1979

[30] Foreign Application Priority Data

Jul. 7, 1978 [DE] Fed. Rep. of Germany ....... 2829851

[51] Int. Cl.³ ............................................. B23K 9/10
[52] U.S. Cl. ........................ 219/124.02; 219/121 PV; 219/121 LX; 318/607; 318/632; 318/662
[58] Field of Search ...................... 219/124.02, 124.03, 219/124.34, 121 PV, 121 LX; 318/607, 606, 619, 662, 676, 632

[56] References Cited

U.S. PATENT DOCUMENTS

| | | | |
|---|---|---|---|
| 3,217,204 | 11/1965 | Nance | 219/124.03 |
| 3,596,050 | 7/1971 | Tikijian | 219/124.03 |
| 3,809,308 | 5/1974 | Roeder et al. | 219/124.02 |

FOREIGN PATENT DOCUMENTS

| | | | |
|---|---|---|---|
| 2556218 | 6/1977 | Fed. Rep. of Germany | 219/124.34 |
| 2641851 | 3/1978 | Fed. Rep. of Germany | 219/124.02 |

*Primary Examiner*—C. C. Shaw
*Attorney, Agent, or Firm*—Connolly and Hutz

[57] ABSTRACT

An arrangement for measuring the distance between a metallic workpiece and a processing tool includes, in addition to a sensing device having a reactance, a compensation sensing arrangement having a reactance with one of the reactances being inductive and the other capacitive and with the reactances being dimensioned and connected in opposition in such a way that by a predetermined lateral approach of the workpiece to the electrodes the tool can be compensated by changes in the reactances.

7 Claims, 2 Drawing Figures

ARRANGEMENT FOR MEASURING THE DISTANCE BETWEEN A METALLIC WORKPIECE AND A PROCESSING TOOL

BACKGROUND OF THE INVENTION

The invention relates to an arrangement for measuring the distance between a metallic workpiece and a processing tool moved relative to the workpiece, especially for adjusting the distance of acetylene, plasma and laser cutting machines whereby at least one capacitance and/or inductive sensing device facing the surface of the workpiece to be processed is provided to the tool; the electrical properties of which can be affected by reducing or increasing the distance to the workpiece and whereby, furthermore, the sensing device is connected to an electrical circuit to evaluate the changes of the electrical properties of the sensing device.

Such arrangements have been known and have been used for a long time already. Electrodes are used as a sensing device which form a reciprocal distance-proportional capacitance with the workpiece, used as a counter electrode. Inductive sensing devices with a coil are also known which are changed distance-proportional in the inductance value by a metallic workpiece. Such arrangements are, for example, described in British Pat. No. 840,275 (British Oxygen Company, Ltd.), U.S. Pat. No. 3,153,109 (C. F. Steventon), U.S. Pat. No. 3,217,204 (H. M. Nance), U.S. Pat. No. 3,596,050 (G. H. Tikijian) as well as German Published Application No. 1,941,728 (Messer Griesheim GmbH).

The evaluation of the distance-proportional change of the applied sensing capacitance or the sensing inductance is carried out, as a rule, in such a way that the sensor is connected in a resonant circuit as a frequency-determining element. Each distance change leads, therefore, to a mistuning of the resonant circuit. This frequency change can then be converted without problems in a known way, for example, by means of a discriminator into DC signals which can be used for indication and/or distance adjustment.

A more serious disadvantage of the known arrangement is primarily that the sensing arrangements are not only affected by distance changes in processing direction to the workpiece, but that also a lateral approach to the workpiece leads to an affecting of the sensing capacitance or sensing inductance. The known arrangements for distance measuring have found application primarily in installations for cutting metal plates. Processing of workpieces with a considerably wavy surface is not possible with the known arrangements, however, since the lateral effect, in other words, also the effect on the sensor parallel to the directon of movement as a result of a material elevation leads to the fact that the sensor "registers" an approach to the workpiece and the processing tool is, therefore, moved away from the workpiece without the occurrence of an actual distance change to the workpiece in the immediate area below the sensor or the tool.

SUMMARY OF THE INVENTION

The invention is based on the objective of preventing the disadvantages of the known method especially, therefore, of improving an arrangement for measuring the distance described above so that also workpieces with irregular surfaces and especially with elevations running parallel to the tool path can be processed without difficulty.

This is primarily attained according to the invention in that a compensation sensing arrangement is provided in addition to the sensing device, which is arranged laterally on the tool in order to be affected by elevations of the workpiece running parallel to the direction of movement of the tool, in that the sensing device and the compensation sensing arrangement have at least each one reactance which can be affected by the workpiece whereby one of the reactances is inductive and the other is capacitive and in that the reactances are dimensioned and electrically connected in opposition in such a way that a pedetermined lateral approach of the workpiece to the electrodes can be compensated by changes of the inductive or capacitive reactance, which are numerically about equal, but are electrically oppositely directed.

An inductive compensation sensing arrangement will be provided for a capacitive measuring arrangement, therefore. Measuring the inductance depends clearly on the arrangement of the sensing arrangement on the tool as well as on the arrangement of the actual sensor and its dimensioning. The dimensioning can be relatively simply determined empirically in the individual case in that for a constant distance of the sensing device to the workpiece, a lateral approach of the workpiece is simulated and in that the change of the reactance of the sensing device or the frequency change of the oscillator is then measured. The dimensioning of the reactance value of the compensation sensing arrangement is then determined in such a way that the error signal produced by the lateral approach is again compensated. Insofar the compensation sensing arrangement is an inductance, which is connected in series with an electrode for the capacitive distance measurement, the lateral approach produces an increase of the capacitance value. Simultaneously, however, the inductance of the compensation sensing arrangement is reduced, since this is affected by the laterally approaching workpiece as a result of an oppositely directed eddy current effect.

Simultaneously with the increase of the capacitance, therefore, a proportional increase of the inductance occurs so that the effects of the lateral approach to the workpiece are compensated. From the formula $f = \frac{1}{2}\pi\sqrt{L \cdot C}$, it can, therefore, be seen that for proportional behavior of L and C, in other words, of inductance and capacitance, the resonance frequency of the arrangement remains constant when an increase of the capacitance value is compensated with a numerically equal reduction of the inductance value during lateral approach. The same applies for the reactances of the appropriate inductance or capacitance so that not only during inclusion of the sensing device or the compensation sensing arrangment in a resonant circuit, but also during measurement evaluation, for example, in measuring bridge connections known per se, a compensation of error signals as a result of lateral approach can be attained.

The effect of a lateral approach on the sensing device can clearly not be described or foreseen in a generally valid way. The effect depends for a capacitive distance electrode, for example, decisively on the arrangement of the electrode on the tool as well as on the relationship between the effective surface of the electrode immediately facing the workpiece as well as on the laterally effective becoming surfaces. The larger the surface of the electrode facing the surface of the workpiece located under the tool is compared to the lateral surface, the smaller the interference effects will be. On the other hand, a withdrawn coil arrangement arranged at the tool via the electrode will be less affected during a "normal" approach to the workpiece.

In any case, a geometric arrangement of the sensing device, on the one hand, and of the compensation sensing arrangement, on the other hand, provides that an approach in the "normal" tool-feed direction leads to an over-proportional change of the sensing device and, therefore, to the release of a signal which can be evaluated and is proportional to the distance change and that, on the other hand, a lateral approach leads to a somewhat proportional affecting of the sensing device and the compensation sensing arrangement so that in all, a compensation takes place.

The invention can be used, in practice, very advantageously in flame cutting machines (e.g. plasma or laser) when an electrode is provided for capacitive distance measurement, which is constructed somewhat like a circular disc, which is arranged parallel to the workpiece and concentrically surrounds the burner nozzle at its bottom end and when the inductance is a coil, also concentrically arranged to the burner nozzle on its bottom end whereby the coil is placed behind the electrode seen from the workpiece. The electrode practically shields the coil from too large an effect during vertical approach to the workpiece. The coil is, however, fully affected by the workpiece during a lateral approach while the disc-shaped electrode has only a relatively small surface laterally facing the workpiece and the capacitance change to be compensated is relatively small.

Such an arrangement can be used, in practice, very advantageously when an annular body of an insulating material, preferably ceramic, is provided at the burner nozzle, when the electrode is arranged on the annular body on its side facing the workpiece and when the coil is concentrically wound around the annular body. Inductance and capacitance form in this way a stable construction unit which can be simply produced and is strong and dependable in operation. The use of a ceramic material as a carrier for the sensing device as well as for the compensation sensing arrangement, in other words, for capacitance and inductance makes the arrangement possible, moreover, in the area of the burner nozzle as a result of which a high measuring accuracy can be obtained.

The invention provides a simple arrangement in all with few passive construction elements, which can be produced strong and economically and can be adapted without problems to the most varying electrode shapes, evaluation devices, tool shapes and the like.

The technical progress and inventive content of the application subject are not only guaranteed by the above mentioned individual characteristics but clearly above all also by the characteristics provided by use in combination and sub-combination.

THE DRAWINGS

The invention is explained below by means of the drawing in more detail in an exemplified embodiment.

FIG. 1 shows the schematic wiring diagram of an arrangement with the characteristics of the invention and FIG. 2 shows the schematic side elevation of a burner nozzle with an arrangement according to FIG. 1.

DETAILED DESCRIPTION

Figure 1:
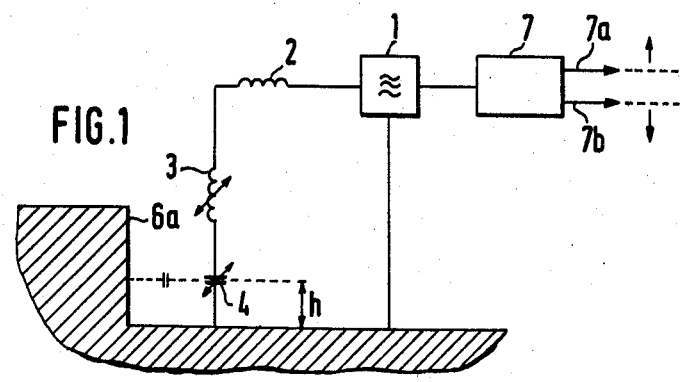

In FIG. 1, an oscillator 1 is connected on the input side in a frequency determining manner to a coil 2, a compensation coil 3 and an electrode-workpiece capacitance 4. The capacitance 4 is formed by the opposing surfaces of an annular electrode 8 arranged on a tool 5 (FIG. 2) and a workpiece 6 to be processed. Each vertical distance change between tool 5 and workpiece 6 leads to a change in the capacitance 4 as a result of which, the frequency of the oscillator 1 is changed. The output of the oscillator 1 is connected to a discriminator circuit 7 in which the frequency fluctuations are converted into regulating signals. The regulating signals are present at the two outputs 7a and 7b and affect in a known way a readjustment of the distance tool 5 from the workpiece 6 as a function of the frequency fluctuations of the oscillator 1 or of the distance-proportional capacitance fluctuations of the capacitance 4.

A lateral approach of the tool 5 to a workpiece flank 6a leads to the fact that in addition to the capacitance 4, an interference capacitance 4a is formed, which leads to a capacitance change—and, therefore, to the frequency change—which is no longer proportional to the distance h between tool 5 and workpiece 6.

Figure 2:
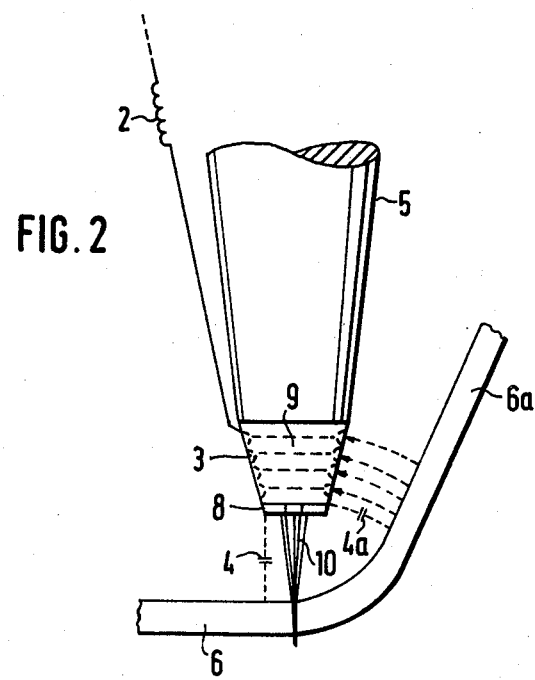

FIG. 2 shows a burner nozzle 5 as a tool for processing a metallic workpiece 6. The interference capacitance 4a is formed in this case primarily between the lateral workpiece flank 6a and the lateral edge of an annular electrode 8 which forms together with the opposing section of the workpiece 6 the capacitance 4. The compensation coil 3 is arranged as can be seen together with the annular electrode 8 on a ceramic body 9 which surrounds the burner nozzle 5. Each lateral approach to the workpiece flank 6a leads, therefore, not only to the increase of the interference capacitance 4a, but simultaneously to an affecting of the inductance of the compensation coil 3. In the exemplified embodiment, the capacitance 4 is, at the nominal distance of 1 mm, about 1 pF, the inductance of the compensation coil 3 is about 5 $\mu$H, the inductance of the coil 2 is about 30 $\mu$H and the frequency of the oscillator 1 is about 7 to 8 MHz depending on the size of capacitance 4. As can be seen, each lateral affecting by a workpiece flank 6a leads to an increase in the interference capacitance 4a and simultaneously to a counter-acting reduction of the inductance of the compensation coil 3. The interference effects of the interference capacitance 4a are, therefore, fully compensated.

The coil 2 is arranged at a distance to the burner nozzle in order to place it away from the immediate sphere of influence of the hot burner gases 10. In order to protect the compensation coil 3 it is wound in coil-shaped recesses of the ceramic body 9 and covered towards the outside by insulating material.

The geometric construction of the annular electrode 8 and the compensation coil 3 can obviously be changed according to the requirements in individual cases. For example, the compensation coil 3 can be arranged only on one side of the burner nozzle 5 or separately held annular electrodes 8 can be used as is generally known and used.

Instead of the series circuit of one sensing capcitance and one compensation coil shown in the exemplified embodiment, it is of course also possible to construct the sensor in a known way as an inductance and to arrange it then according to a compensation capacitance. The expert is familiar with such measures. Moreover, slight additional interference capacitance or circuit inductances of subordinate significance have not been considered, either in the description or in the drawing. For example, the circular electrode can lead to slight inductive effects and smaller scatter capacitances can also form between the individual windings of the compensation coil and the workpiece flank 6a, which only sightly affect the measuring results, however. Ohm's resistances in the feed circuit or in the coil have not been considered in the wiring diagram according to FIG. 1. They do, however, not affect the arrangement.

I claim:

1. In an arrangement for measuring the distance between a metallic workpiece and a processing tool moved toward and away from the workpiece, especially for adjusting the distance of acetylene, plasma and laser cutting machines whereby at least one sensing device facing the surface of the workpiece to be processed is provided to the tool; wherein the electrical properties of the sensing device can be affected by selectively reducing and increasing the distance to the workpiece and whereby the sensing device is connected to an electrical circuit to evaluate the changes of the electrical properties of the sensing device, the improvement being a compensation sensing arrangement in addition to the sensing device, the compensation sensing arrangement being arranged laterally on the tool to be affected by elevations of the workpiece disposed parallel to the direction of movement of the tool, each of the sensing device and the compensation sensing arrangement having a reactance which can be affected by the workpiece to comprise a pair of reactances, one of the reactances being inductive and the other being capacitive, and the reactances are dimensioned and electrically connected in opposition in such a way that by a predetermined lateral approach of the workpiece to the electrodes the tool can be compensated by changes of the respective inductive and capacitive reactances which are numerically about equal but are electrically oppositely directed.

2. Arrangement according to claim 1, characterized in that the reactances are connected in series.

3. Arrangement according to claim 1 or 2 wherein the sensing device is a capacitive sensing device which has an electrode which is connected to the electrical circuit whereby the workpiece is also connected to the circuit and is used as a counter-electrode in such a way that the capacitance between workpiece and electrode can be changed with respect to electrode-workpiece distance, and an inductance is arranged in series to the electrode.

4. Arrangememt according to claim 3, characterized in that the electrode is a generally circular disc which is arranged about parallel to the workpiece and concentrically surrounds the burner nozzle at its bottom end, and the inductance is a coil also concentrically arranged to the burner nozzle at its bottom end whereby the coil is placed behind the electrode seen from the workpiece.

5. Arrangement according to claim 3, characterized in that an annular body of an insulating material, is on the burner nozzle, and the electrode is arranged on the annular body on its side facing the workpiece and in that the coil is concentrically wound around the annular body.

6. Arrangement according to claim 5, characterized in that the insulating material is ceramic.

7. Arrangement according to claim 4, characterized in that the generally circular disc is ring shaped.

* * * * *